(12) United States Patent
Kilpinen

(10) Patent No.: US 7,594,299 B2
(45) Date of Patent: Sep. 29, 2009

(54) STABILIZING MECHANISM FOR HINGED DEVICES

(75) Inventor: Janne T. Kilpinen, Toijala (FI)

(73) Assignee: Nokia Corporation, Espoo (FI)

( * ) Notice: Subject to any disclaimer, the term of this patent is extended or adjusted under 35 U.S.C. 154(b) by 339 days.

(21) Appl. No.: 11/198,020

(22) Filed: Aug. 4, 2005

(65) Prior Publication Data

US 2007/0028418 A1    Feb. 8, 2007

(51) Int. Cl.
    *E05D 1/00* (2006.01)
(52) U.S. Cl. .............................. 16/225; 16/286; 16/385; 16/DIG. 13
(58) Field of Classification Search ................... 16/338, 16/330, 225, 367, 286, 287, 366, 385, DIG. 13; 379/433.13, 433.11, 433.12; 455/575.3; 361/679.06, 679.07, 679.11, 679.12, 679.15, 361/679.16, 679.2, 679.27, 679.28
    See application file for complete search history.

(56) References Cited

U.S. PATENT DOCUMENTS

| | | | | |
|---|---|---|---|---|
| 3,551,940 A * | 1/1971 | Edison | .......................... | 16/225 |
| 4,403,712 A * | 9/1983 | Wiesinger | .................... | 220/839 |
| 4,982,866 A * | 1/1991 | Krawagna | .................... | 220/838 |
| 4,984,706 A * | 1/1991 | Cadwell et al. | ........... | 312/223.2 |
| 5,259,019 A * | 11/1993 | Stilley | ...................... | 455/575.3 |
| 5,363,089 A * | 11/1994 | Goldenberg | ................ | 340/7.63 |
| 5,502,460 A * | 3/1996 | Bowen | ........................ | 345/168 |
| 5,644,338 A * | 7/1997 | Bowen | ........................ | 345/168 |
| 6,154,359 A * | 11/2000 | Kamikakai et al. | ........... | 361/681 |
| 6,175,989 B1 * | 1/2001 | Carpenter et al. | .............. | 16/225 |
| 6,223,393 B1 * | 5/2001 | Knopf | .......................... | 16/366 |
| 6,460,221 B1 * | 10/2002 | Eromaki | ...................... | 16/286 |
| 6,930,881 B2 * | 8/2005 | Karidis et al. | ............... | 361/683 |
| 6,968,056 B2 * | 11/2005 | Barnett et al. | ........... | 379/433.13 |
| 7,016,712 B2 * | 3/2006 | Newman et al. | .......... | 455/575.3 |
| 7,050,293 B2 * | 5/2006 | Arbisi et al. | ................. | 361/681 |
| 7,082,196 B2 * | 7/2006 | Kauhaniemi et al. | ......... | 379/447 |
| 7,158,634 B2 * | 1/2007 | Eromaki | ................. | 379/433.13 |
| 7,181,256 B2 * | 2/2007 | Hyun et al. | ............... | 455/575.3 |
| 7,246,714 B2 * | 7/2007 | Garg et al. | .................. | 220/4.23 |
| 7,251,323 B2 * | 7/2007 | Holtorf et al. | ........... | 379/433.13 |
| 2002/0133906 A1 * | 9/2002 | Fedon | .......................... | 16/225 |
| 2003/0076018 A1 * | 4/2003 | Helot et al. | ............... | 312/223.2 |
| 2003/0118179 A1 * | 6/2003 | Barnett et al. | ........... | 379/428.01 |

(Continued)

*Primary Examiner*—Victor Batson
*Assistant Examiner*—Jeffrey O'Brien
(74) *Attorney, Agent, or Firm*—Ware, Fressola, Van Der Sluys & Adolphson LLP

(57) ABSTRACT

A stabilizing mechanism for a two part foldable hinged device having a cover and a base is disclosed and includes at least one elastic member having one end attached to the cover and a second opposite end attached to the base. The elastic member has a bending section defined between the ends which extends to increase the contact surface area of the base as the cover pivots open with respect to the base to keep the device from tipping over when the device is placed on a resting surface. The bending section is formed between two spaced apart knuckles whereby the elastic member bends with a controlled variable displacement to provide a greater rate of available contact surface as the cover and base pivot relative to one another, particularly between 90° and 180°. A portion of the second opposite end of the elastic member may extend beyond the downwardly facing surface of the base to make contact with the resting surface to prevent the device from sliding on the surface.

16 Claims, 5 Drawing Sheets

U.S. PATENT DOCUMENTS

2004/0203507 A1* 10/2004 Newman et al. ........... 455/90.3
2004/0256964 A1* 12/2004 Helot et al. .............. 312/223.2
2004/0266496 A1* 12/2004 Kauhaniemi et al. ..... 455/575.1
2006/0034451 A1* 2/2006 Ijas et al. ............... 379/433.13

* cited by examiner

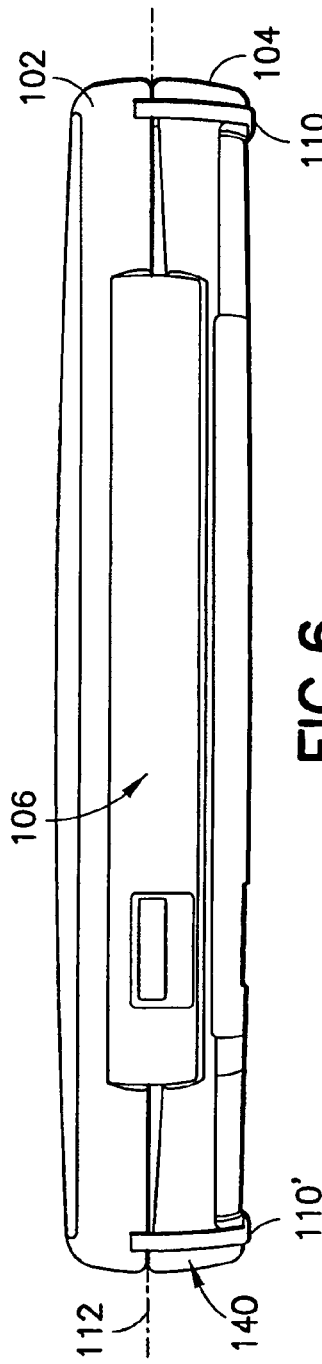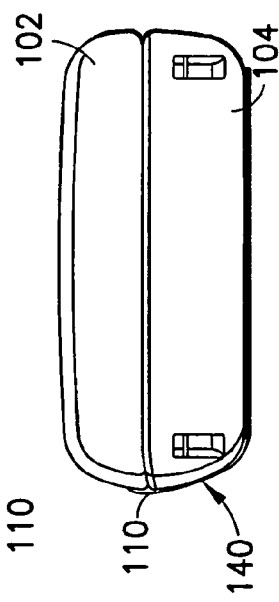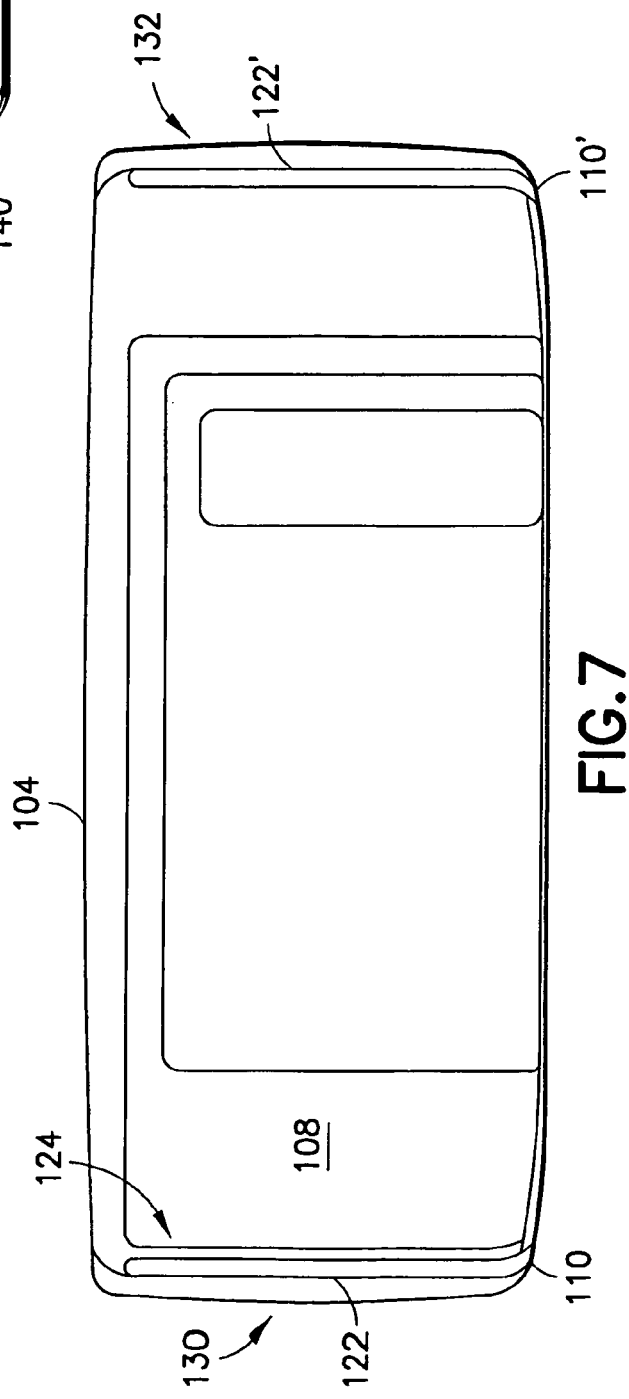

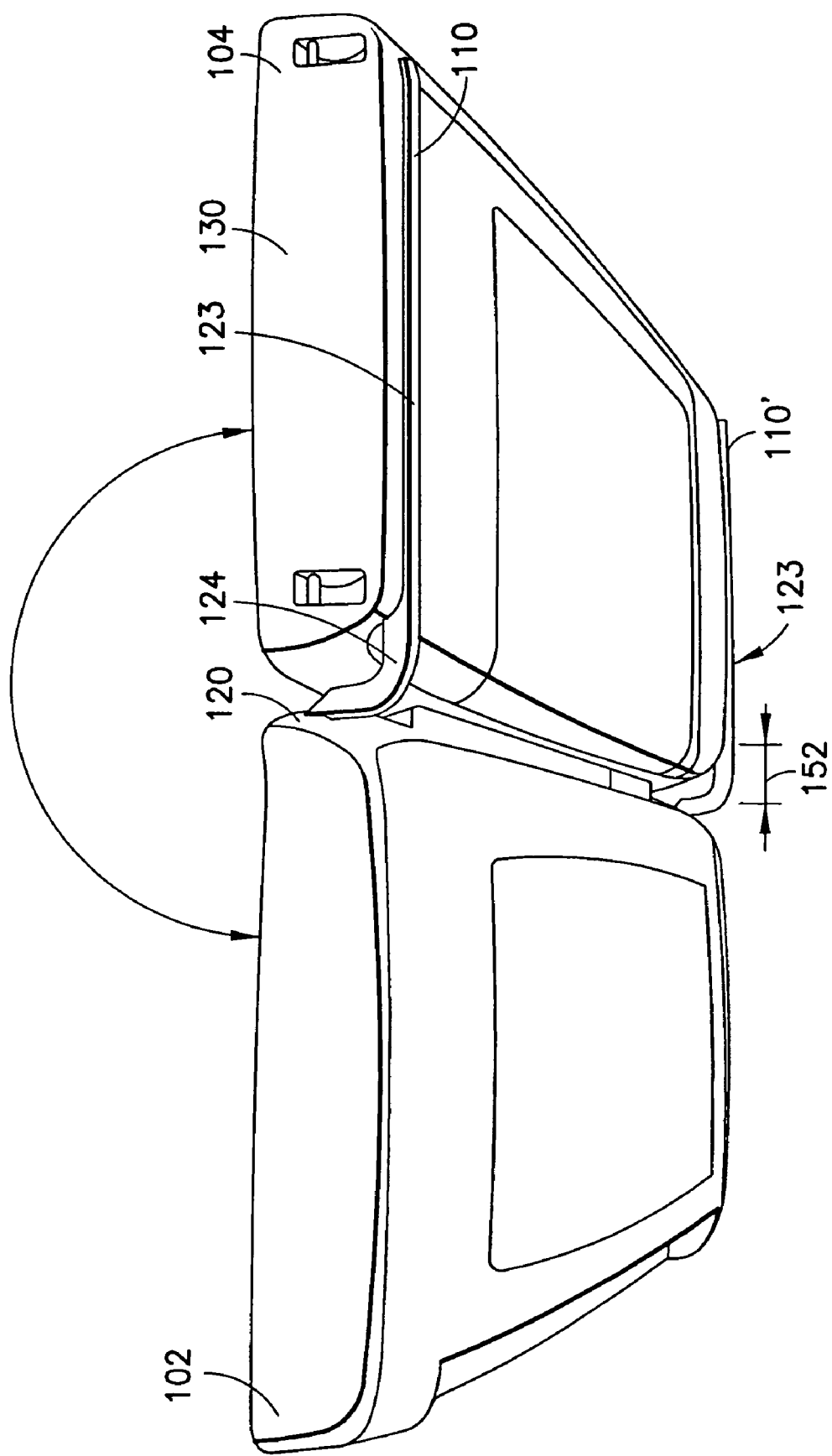

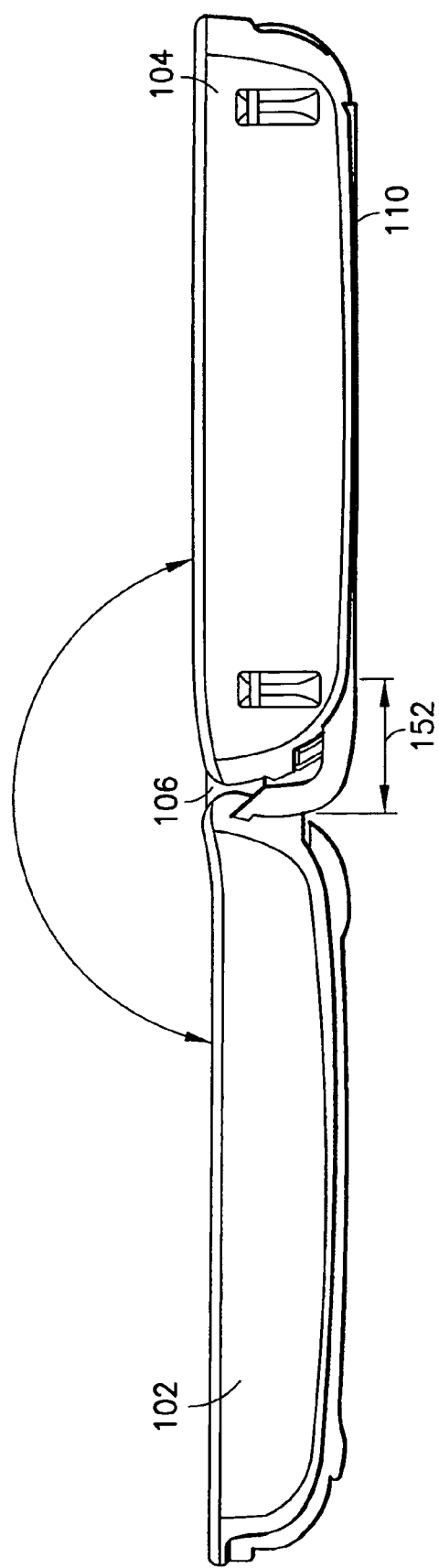
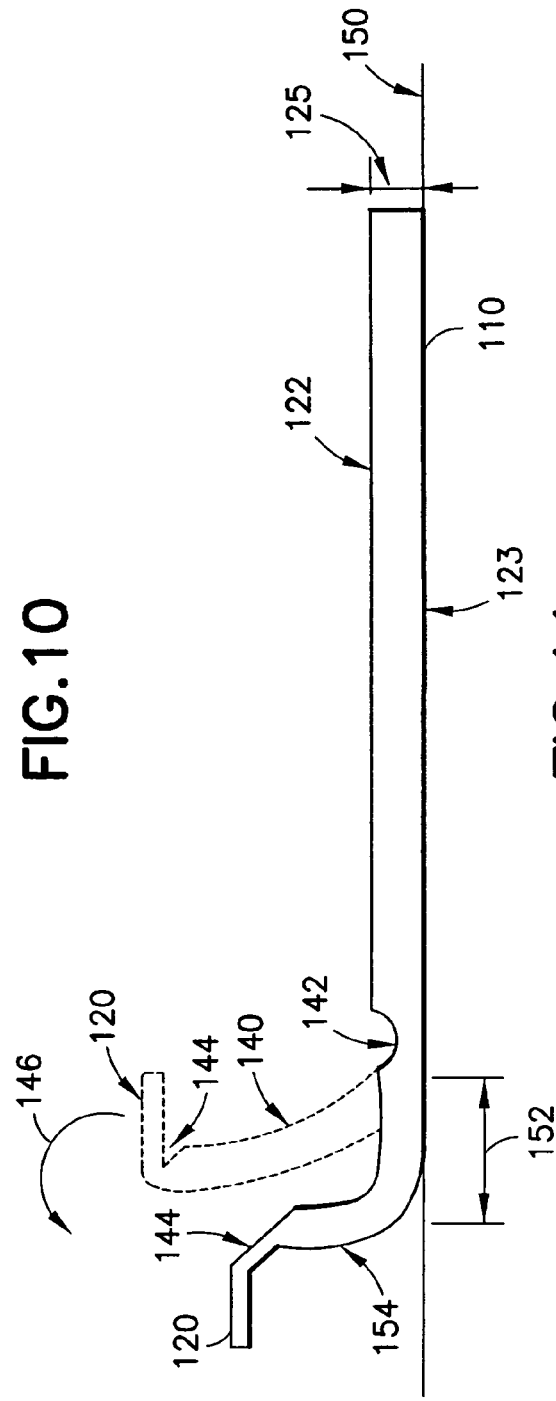

STABILIZING MECHANISM FOR HINGED DEVICES

TECHNICAL FIELD

The present invention relates generally to hinged foldable devices and deals more particularly with a stabilizing mechanism for a two part foldable hinged device to keep the device from tipping over when placed on a resting surface and in an opened position particularly in an opened position between 90° and 180°.

BACKGROUND OF THE INVENTION

Hinged devices, for example two part hinged foldable devices such as mobile telephones, laptops and communicator products tend to become unstable or tip over when the device is placed on a table or resting surface and the cover or lid is opened or pivoted relative to the base particularly in an angular range from 90° to 180°. Often, these hinged devices have a keyboard or keypad in one part generally the base, and a display or screen in the other part generally the cover or lid such that the display is viewable when the keys are operated. The relative angular position of the cover is usually adjustable relative to the keypad to optimize the viewing for the user. In many instances when the cover is located in the angular range between 90° and 180°, the device tips or falls over or sways when the keys of the keypad are contacted and pressed. The hinged device often also tends to slip or slide on the resting surface during operation of the device for example when operating the keys.

A prior art two part foldable hinged device generally designated 10 and is shown in FIGS. 1-4 includes a first part or cover 12 pivotally connected to a second part or base 14 by means of a hinge 16. The base 14 includes a downwardly facing base contact surface 18 when the hinged device 10 rests on a resting surface 20. The hinged device 10 is shown in its closed or fully folded position in FIG. 1 and its center of gravity generally designated 22 is located approximately in the center of the closed device. The hinged device 10 is opened when the cover 12 is moved in the direction indicated by the direction arrow 30 about the pivot axis 24 relative to the base 14 with an angular separation between the viewing side 26 of the cover 12 and the keypad side 28 of the base 14 through the angular range indicated by the arrow 32. When the cover 12 is moved in the direction 30, the angular separation 32 between the cover 12 and the base 14 increases moving the center of gravity 22' in the direction indicated by arrow 34 toward the hinge 16 as illustrated in FIG. 2 and the hinged device 10 continues to maintain a stable open position. As the cover 12 continues to pivot open in the direction indicated by the arrow 30 to further increase the angular separation 32' between the cover 12 and the base 14, the center of gravity 22'' continues to move in the direction indicated by arrow 34 toward the hinge 16 and the pivot axis 24 and approaches a critical supporting point wherein the hinged device 10 is in a barely stable condition as illustrated in FIG. 3. When the cover 12 is further pivoted open in the direction indicated by arrow 30 to further increase the angular separation 32'' between the cover 12 and the base 14, the center of gravity 22''' moves in a direction indicated by arrow 34 beyond the pivot axis 24 and the critical supporting point. The hinged device 10 is now in an unstable resting condition with the tendency of the front 36 of the base unit 14 to move upwardly away from the resting surface 20 as indicated by the direction arrow 38 with the cover 12 tending to move downwardly toward the resting surface in the direction indicated by arrow 39 as illustrated in FIG. 4.

Prior art attempts to solve the stability and tip over problem of hinged devices have not been satisfactory particularly if a device can still fall over even if the cover is approaching the 180° open position. The user is thus prevented from maintaining the hinged device on a table or other resting surface and tends to preclude the lid from being pivoted to the desired open angular position between 90° and 180°.

The present invention was created to solve the problems stated above to provide a two part hinged foldable device wherein the user may select any cover position between a fully closed folded position and a fully opened unfolded position in which the stability of the device is maintained without any further action on the part of the user throughout the full angular range of separation between the two parts of the hinged device.

It is an object of the present invention to provide a stabilization mechanism for a two part foldable hinged device.

It is a further object of the present invention to provide a stabilization mechanism for a two part foldable hinged device that also functions to prevent the device from sliding on a resting surface during operation of the device.

SUMMARY OF THE INVENTION

In accordance with a broad aspect of the invention, a two part foldable hinged device having a base and a cover includes at least one elastic member having one end attached to the cover and a second opposite end attached to the base. The elastic member has a bending section defined between the ends which extends when the cover is pivoted open with respect to the base to increase the contact surface area of the base as the cover pivots open with respect to the base to keep the device from tipping over when the device is placed on a resting surface. The bending section is formed between two spaced apart knuckles whereby the elastic member bends with a controlled variable displacement to provide a greater rate of available contact surface as the cover and base pivot relative to one another, particularly between 90° and 180°. The base has a downwardly facing surface contact area and a least one lengthwise groove to receive the second opposite end of the elastic member. A portion of the second opposite end of the elastic member may extend beyond the downwardly facing surface of the base to make contact with the resting surface to prevent the device from sliding on the surface. The elastic member may be an elastomeric material and has memory retention characteristics.

BRIEF DESCRIPTION OF THE DRAWINGS

Other objects, features and advantages of the present invention will become readily apparent from the written description taken in conjunction with the drawings wherein:

FIG. 6 is a rear view of the hinged two part folded device illustrated in FIG. 5.

FIG. 7 is a bottom view of the hinged two part folded device illustrated in FIG. 5.

FIG. 8 is a side view of the hinged two part folded device illustrated in FIG. 5.

FIG. 9 is a schematic perspective view of the hinged two part folded device of FIG. 5 in a fully opened operative position showing the stabling mechanism extended to increase the surface contact resting area of the base part in back of the hinge pivot axis to maintain a stable resting condition.

FIG. 10 is a schematic side view of the hinged two part folded device illustrated in FIG. 9 in a fully open operative resting condition.

FIG. 11 is a schematic side view of the stabilizing mechanism of the present invention shown in an at rest condition and in an extended unfolded condition.

WRITTEN DESCRIPTION OF PREFERRED EMBODIMENTS

Turning now to FIGS. 5-10, a hinged two part foldable device embodying the stabilizing mechanism of the present invention is illustrated therein and generally designated 100. The hinged two part device 100 may be for example, a portable electronic device including but not limited to a laptop, notebook or tablet style portable computer; a portable communication device including but not limited to a mobile terminal, a multi-media communication device, a mobile cellular telephone, a GPS device; a portable hand-held electronic device including but not limited to a music player, a video player, a PDA, a gaming device and compact, pocket sized electronic devices. The stabilizing mechanism of the present invention is intended for use with any hinged two part foldable device and is not limited to the foregoing examples.

Figure 1:
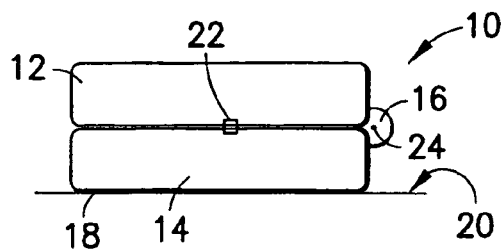
FIG. 1 is a schematic side view of a prior art hinged two part folded device in a closed resting position.
Figure 2:
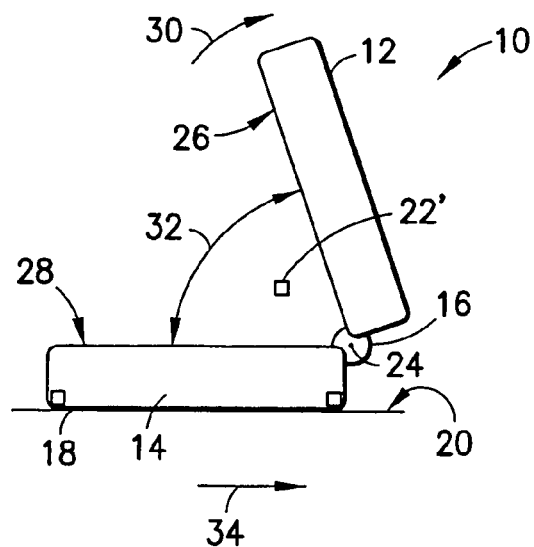
FIG. 2 is a schematic side view of the prior art hinged two part folded device of FIG. 1 showing the cover part pivoted open less than 90° with respect to the base part and resting on a surface wherein the center of gravity is located closer to the hinged pivot point in which the device remains in a stable resting condition.
Figure 3:
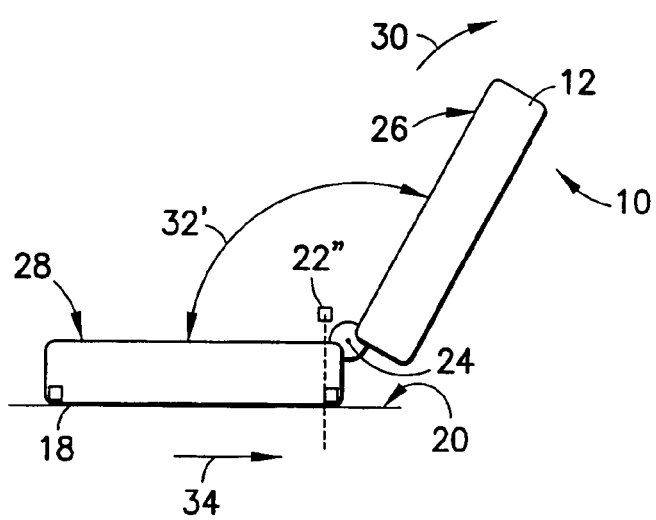
FIG. 3 is a schematic side view of the prior art hinged two part folded device of FIG. 1 showing the cover part pivoted open greater than 90° with respect to the base part resting on a surface wherein the center of gravity is located just in front of the hinged pivot point in which the device remains in a barely stable resting condition.
Figure 4:
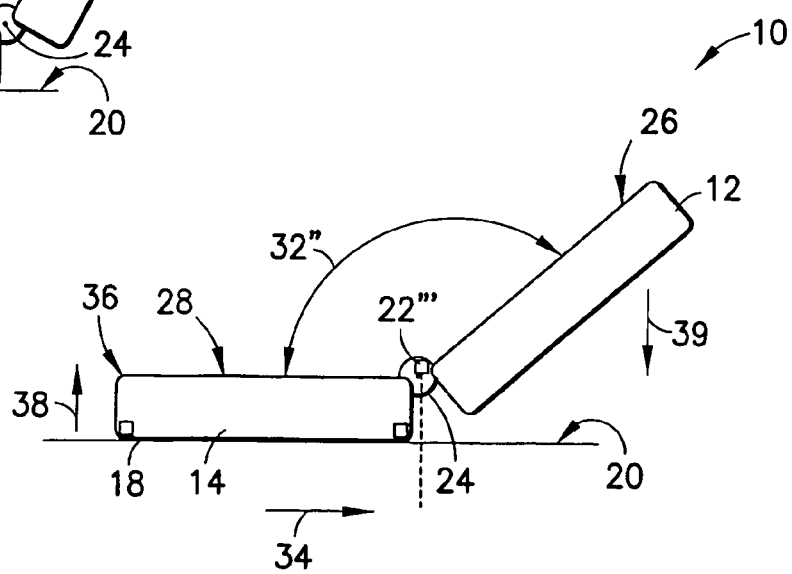
FIG. 4 is a schematic side view of the prior art hinged two part folded device of FIG. 1 showing the cover part pivoted open greater than 90° but less than 180° with respect to the base part resting on a surface wherein the center of gravity is located just to the rear of the hinged pivot point in which the device is placed in an unstable resting condition.
Figure 5:
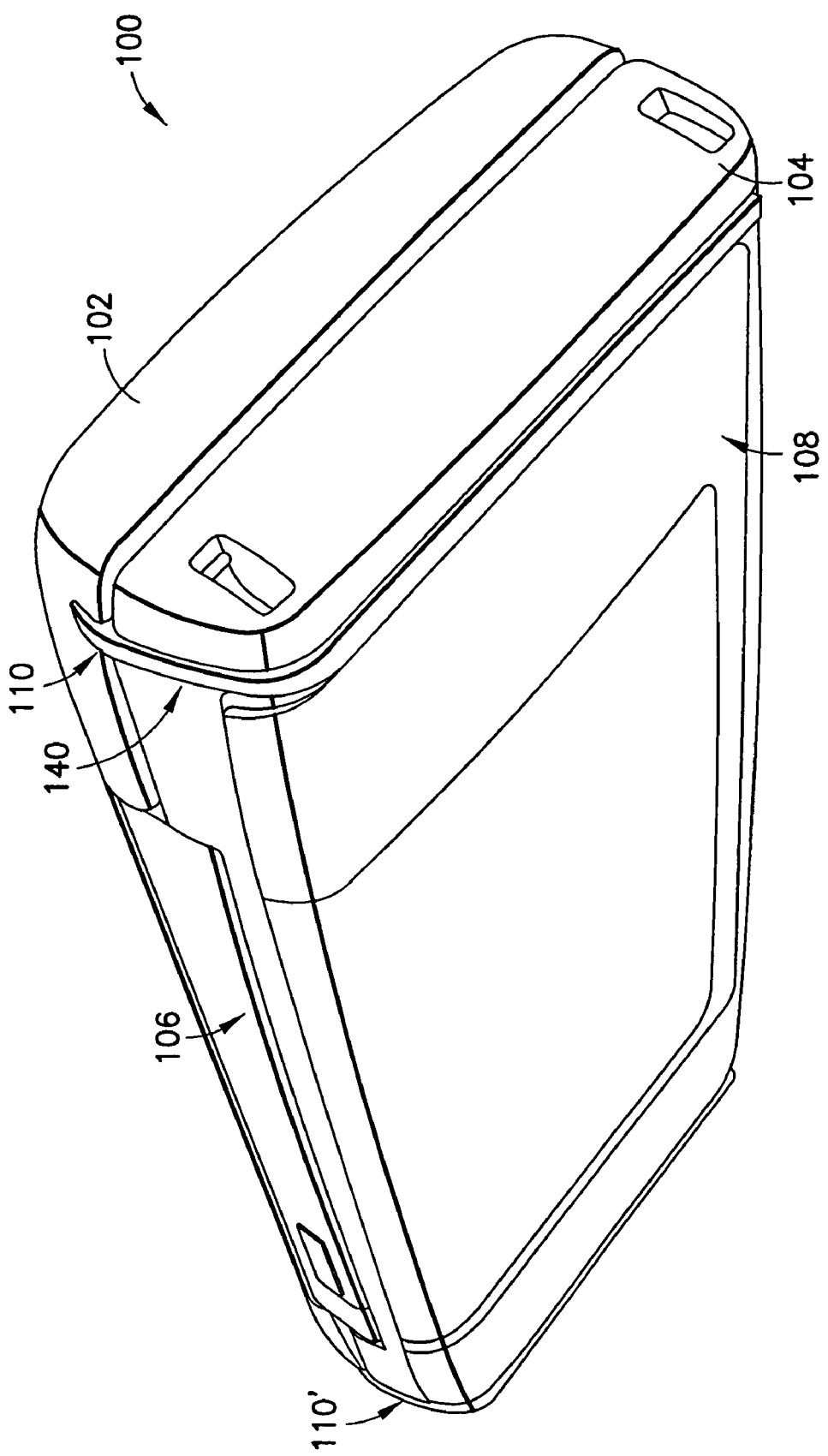
FIG. 5 is a schematic perspective view of a hinged two part folded device in a closed operative position and embodying the stabling mechanism of the present invention.

The hinged two part device 100 includes a first part or cover 102 hingedly connected to a second part or base 104 by a hinge member 106 and arranged for pivotal movement with respect to one another about a longitudinal folding axis 112 passing through the hinge member 106. The cover 102 and the base 104 of the hinged two part device 100 pivot from a fully closed folded position as illustrated in FIGS. 5, 6 and 8 through a predetermined angular range of approximately 180° to a fully opened operative position as illustrated in FIGS. 9 and 10. The hinged device 100 is suitably configured in an operative condition throughout the angular range.

The stabilizing mechanism embodying the invention is shown schematically in FIG. 11 and generally designated 110 and is made of a suitable elastomeric material having memory retention characteristics to return to its at rest configuration from its extended operative configuration as described below. In one embodiment, the stabilizing mechanism 110 includes a first end 120 arranged to be fixedly attached to the cover 102 outwardly of the hinge mechanism 106. The first end 120 is attached using any suitable means including frictional engagement of the end into a complementary sized and shaped opening appropriately located in the rear wall of the cover 102. The stabilizing mechanism 110 includes a second end portion 122 arranged to be fixedly attached to the resting surface side 108 of the base part 104. The second end portion 122 which is axially elongated and suitably sized and shaped to fit and be received in a complementary sized and shaped lengthwise groove 124 located inwardly in a spaced relation with a first side marginal edge 130 of the base 104. A second stabilizing mechanism 110' has its second end 122' fixedly attached in a lengthwise groove 124' located inwardly in a spaced relation with a second marginal edge 132 of the base part 104 opposite the first side marginal edge 130 to receive the end 122'. The thickness dimension 125 of the end 122 may be made larger than the depth dimension of the groove 124 such that a portion of the outwardly exposed side 123 provides a gripping surface for the base 104 to prevent the device from sliding on a resting surface during operation of the device.

The stabilizing mechanism 110 includes a bending portion generally designated 140 defined between two spaced apart knuckles 142, 144 formed in the elastomeric material of the stabilizing mechanism 110. When the cover 102 is pivoted away from the base 104, the end 120 is likewise driven by the lid in the direction indicated by the arrow 146 causing the lower section of the bending portion 140 to move away from the base 104 and extend into contact with a resting surface 150 for example of a table upon which the device is placed such that an additional surface area 152 of the lower section of the bending portion 140 contacts the resting surface 150. As the cover 102 is further opened between 90° and 180°, the lower section of the bending portion 140 further bends as shown in FIG. 11 more and more of the lower portion extends in back of the hinge pivot axis to provide an additional surface contacting area 152 for the base 104 thereby translating the center of gravity of the opened hinged two part device 100 to keep it from tipping over. Thus the critical supporting point is translated so it provides support to the two part hinged device over the entire angular range from the fully closed folded position to the cover fully opened position. The additional surface area 152 of the lower section of the bending portion 140 also provides a gripping surface for the base 104 to prevent the device from sliding on a resting surface during operation of the device.

The stabilizing mechanism 110 embodying the present invention utilizes the bending characteristics of elastic materials such as elastomers, spring steel, rubber or other suitable materials having the desired characteristics to carry out the intended function. Under pressure, an elastic part generates an opposing force which is dependent on the elastic part's rigidity. When the elastic part is bent, it attempts to return to its initial orientation or configuration due to the memory characteristics of the material. An elastic material typically bends more around a thin cross section area than a thick cross section area. Accordingly, the rate of bending and amount of bending of the bending portion 140 is controlled by a suitable dimensioning of the knuckles 142 and 144. By making the dimension of the knuckle 144 thinner than the dimension of the knuckle 142, the end 120 bends at a faster rate than the lower section of the bending portion 140 as the cover 102 is pivoted open from its closed position. As the cover 102 reaches 90°, the lower section of the bending portion is now starting to extend as the bending portion 140 begins to bend. As the cover 102 pivots beyond 90°, the lower section of the bending portion 140 bends faster to increase the required addition surface contacting area 152 to keep the device from tipping over. The additional surface contacting area 152 may also be controlled by providing additional stiffening in the area 154 of the bending portion 140 such that the bending portion 140 bends with a controlled variable displacement to provide a greater rate of available contact surface as the cover and base parts pivot relative to one another between 90° and 180°.

The stabilizing mechanism of the present invention may be used with any device which has two pivotally connected parts such as a mobile telephone, a personal digital assistant, a laptop computer, a CD player, a DVD player, a communicator device and other such two part hinged devices which are well known by the consuming public.

A stabilizing mechanism for use in two part hinged devices has been presented above in several preferred embodiments.

It is to be understood that changes and modifications may be made without departing from the spirit and scope of the invention as set forth in the claims. Therefore, the invention has been described by way of illustration rather than limitation.

The invention claimed is:

1. A foldable device, comprising:
   a first part;
   a second part;
   a hinge;
   said first and second parts hingedly connected to one another and arranged for pivotal movement with respect to one another about a longitudinal folding axis passing through said hinge, said first and second parts pivoting from a closed folded position through a pre-determined angular range to an open position, wherein said foldable device is configured in an infinite number of stable operative positions through the pre-determined angular range; and
   a stabilizing mechanism including at least one elastic member having one end fixedly attached to said first part and an opposite end fixedly attached to said second part, said elastic member having a bending section defined between said first and second ends and transverse to the longitudinal folding axis, such that said pivotal movement of said first part with respect to said second part causes said bending section to extend a proportional distance beyond a plane substantially perpendicular to the major face surfaces of said first and second parts and passing through said longitudinal folding axis as said first part is pivoted through said pre-determined angular range to provide an increasing contact surface area to keep the device from tipping over when the device is placed on a resting surface,
   wherein said bending section is formed between two spaced apart knuckles such that said elastic member bends with a controlled variable displacement to provide a greater rate of available contact surface as said first and second parts pivot relative to one another, said two spaced apart knuckles comprising a first knuckle located nearest said first part and a second knuckle located nearest said second part, said first knuckle having a dimension that is thinner than a dimension of said second knuckle such that the first knuckle deforms and bends at a faster rate than the second knuckle when the first part pivotably moves from said open position to said closed position.

2. The foldable device as defined in claim 1 wherein said first and second parts pivot relative to one another between 90° and 180°.

3. The foldable device defined in claim 1 wherein said first part is a cover portion and said second part is a base portion, said base portion having a downwardly facing surface contact area and at least one lengthwise groove located in a spaced relation with a first side marginal edge and second side marginal edge opposite said first side marginal edge of said base portion to receive said opposite end of said elastic member.

4. The foldable device defined in claim 3 wherein said elastic member opposite end has at least a portion extending beyond said downwardly facing surface contact area for making contact with said resting surface to prevent said foldable device from sliding on said resting surface.

5. The foldable device defined in claim 1 wherein said elastic member is an elastomeric material.

6. The foldable device defined in claim 1 wherein said elastic member has memory retention characteristics.

7. The foldable device as defined in claim 1 further comprising a portable electronic device.

8. The foldable device as defined in claim 7 wherein said portable electronic device is a portable communication device.

9. The foldable device as defined in claim 7 wherein said portable electronic device is a portable hand-held electronic device.

10. The foldable device as defined in claim 7 wherein said portable electronic device is a compact, pocket sized electronic device.

11. A stabilizing mechanism in a hinged two part device having a first part arranged for pivotal movement with respect to a second part about a longitudinal folding axis passing through a hinge connecting said first and second parts for pivoting from a closed folded position through a pre-determined angular range to an open position, wherein said foldable device is configured in an infinite number of stable operative positions through the pre-determined angular range, comprising:
   at least one elastic member having one end fixedly attached to said first part and an opposite end fixedly attached to said second part, said elastic member having a bending section defined between said first and second ends and transverse to the longitudinal folding axis and formed between two spaced apart knuckles, such that said elastic member bends with a controlled variable displacement to provide an increasing contact surface as said first and second parts pivot relative to one another to keep the device from tipping over when the device is placed on a resting surface, said two spaced apart knuckles comprising a first knuckle located nearest said first part and a second knuckle located nearest said second part, said first knuckle having a dimension that is thinner than a dimension of said second knuckle such that the first knuckle deforms and bends at a faster rate than the second knuckle when the first part pivotably moves from said open position to said closed position.

12. The stabilizing mechanism defined in claim 11, wherein said first and second parts pivot relative to one another between 90° and 180°.

13. The stabilizing mechanism defined in claim 11, wherein said first part is a cover portion and said second part is a base portion, said base portion having a downwardly facing surface contact area and at least one lengthwise groove located in a spaced relation with a first side marginal edge and second side marginal edge opposite said first side marginal edge of said base portion to receive said opposite end of said elastic member.

14. The stabilizing mechanism defined in claim 13 wherein said elastic member opposite end has at least a portion extending beyond said downwardly facing surface contact area for making contact with said resting surface to prevent said foldable device from sliding on said resting surface.

15. The stabilizing mechanism defined in claim 11, wherein said elastic member is an elastomeric material.

16. The stabilizing mechanism defined in claim 11, wherein said elastic member has memory retention characteristics.

* * * * *

UNITED STATES PATENT AND TRADEMARK OFFICE
CERTIFICATE OF CORRECTION

PATENT NO. : 7,594,299 B2  Page 1 of 1
APPLICATION NO. : 11/198020
DATED : September 29, 2009
INVENTOR(S) : Janne T. Kilpinen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this

Twenty-eighth Day of September, 2010

David J. Kappos
*Director of the United States Patent and Trademark Office*